United States Patent [19]

Shimoyama et al.

[11] Patent Number: 5,950,678
[45] Date of Patent: Sep. 14, 1999

[54] HYDRAULIC CONTROL SYSTEM WITH ONE-WAY ORIFICE FOR AUTOMATIC TRANSMISSIONS

[76] Inventors: Akihiro Shimoyama; Makoto Kondoh, both of c/o JATCO Corporation 700-1, Aza Kamoda, Imaizumi, Fuji-shi, Shizuoka 417, Japan

[21] Appl. No.: 08/805,163

[22] Filed: Feb. 24, 1997

[30] Foreign Application Priority Data

Feb. 29, 1996 [JP] Japan ................................. 8-042953

[51] Int. Cl.⁶ ..................................................... F15D 1/08
[52] U.S. Cl. ........................................... 138/45; 138/46
[58] Field of Search ........................... 138/45, 46, 43; 251/120

[56] References Cited

U.S. PATENT DOCUMENTS

| | | | |
|---|---|---|---|
| 2,919,719 | 1/1960 | Boulet | 138/43 |
| 2,984,261 | 5/1961 | Kates | 138/46 |
| 3,050,086 | 8/1962 | Honsinger | 138/45 |
| 3,130,747 | 4/1964 | Benaway | 138/43 |
| 3,426,793 | 2/1969 | Klemm et al. | 138/46 |
| 4,383,552 | 5/1983 | Baker | 138/43 |
| 4,437,493 | 3/1984 | Okuda et al. | 138/45 |
| 4,860,795 | 8/1989 | Oten | 138/43 |
| 5,323,773 | 6/1994 | Kobayashi | 137/513.3 |
| 5,373,873 | 12/1994 | Miller et al. | 138/45 |

FOREIGN PATENT DOCUMENTS

| | | |
|---|---|---|
| 31 49 604 | 7/1983 | Germany. |
| 39 32 269 | 4/1991 | Germany. |
| 63-101355 | 7/1988 | Japan. |

*Primary Examiner*—James F. Hook

[57] ABSTRACT

A hydraulic control system for automatic transmissions includes a separate plate interposed between valve bodies and formed with a first hole for fluid communication between the valve bodies. A cup is disposed in one of the valve bodies, having a bottom biased to contact the separate plate. The bottom of the cup is formed with a second hole which fluidly communicates with the first hole. The second hole is smaller in radial dimension than the first hole, and includes two truncated-cone holes with a minimum-diameter portion.

5 Claims, 2 Drawing Sheets

HYDRAULIC CONTROL SYSTEM WITH ONE-WAY ORIFICE FOR AUTOMATIC TRANSMISSIONS

BACKGROUND OF THE INVENTION

1. Field of the Invention

The present invention relates to a hydraulic control system with a one-way orifice for automatic transmissions.

2. Description of Related Art

One of the conventionally proposed hydraulic control systems for automatic transmissions is disclosed in JP-U 63-101355. In this hydraulic control system, interposed between two valve bodies which constitute a hydraulic circuit when connected to each other is a separate plate which is formed with a one-way orifice of a small-diameter hole having one end or both ends enlarged in a conical surface, or a one-way orifice of small-diameter holes so as to reduce noise of oil passing through the one-way orifice.

With the known hydraulic control system, oil noise is reduced by the conical surface of the one-way orifice. However, the magnitude of oil noise is dependent on the flow rate and the viscosity of oil passing through the one-way orifice, so that, in order to obtain sufficient noise eliminating effect, the angle of the conical surface of the one-way orifice or the length of a non-conical surface portion thereof, i.e., the length of contact of oil with the one-way orifice should be changed in accordance with the flow rate and the viscosity of oil, resulting in a problem of increased kinds of separate plates.

A reduction in the length of contact of oil is obtained by a method of increasing the depth of the conical surface without changing the angle of the conical surface, or a method of increasing the depth of the conical surface by decreasing the angle of the conical surface without changing the radial dimension of a large-diameter end thereof. However, according to the former method, a large-diameter end of the conical surface has increased radial dimension, producing possible interference with a sealing member of the valve body. On the other hand, according to the latter method, decreased angle of the conical surface causes a reduction in noise eliminating effect.

SUMMARY OF THE INVENTION

It is, therefore, an object of the present invention to provide a hydraulic control system with a one-way orifice for automatic transmissions, which is free from the above inconveniences, and has improved noise eliminating effect.

According to one aspect of the present invention, there is provided a hydraulic control system, comprising:

valve bodies;

a separate plate interposed between said valve bodies, said separate plate being formed with a first hole for fluid communication between said valve bodies; and a cup disposed in one of said valve bodies, said cup having a bottom biased to contact said separate plate, said bottom being formed with a second hole fluidly communicating with said first hole, said second hole being smaller in diameter than said first hole, said second hole gradually decreasing in diameter up to a predetermined distance from said separate plate, said second hole gradually increasing in diameter from said predetermined distance, wherein said first hole is effective during fluid flow from said separate plate to said cup, and said second hole is effective during fluid flow from said cup to said separate plate.

Another aspect of the present invention lies in providing a hydraulic control system, comprising:

valve bodies;

a separate plate interposed between said valve bodies, said separate plate being formed with a first hole for fluid communication between said valve bodies;

a cup disposed in one of said valve bodies, said cup having a bottom biased to contact said separate plate; and means for defining a second hole fluidly communicating with said first hole, said second hole being smaller in diameter than said first hole, said second hole being gradually decreased in diameter up to a predetermined distance from said separate plate, said second hole being gradually increased in diameter from said predetermined distance, wherein said first hole is effective during fluid flow from said separate plate to said cup, and said second hole is effective during fluid flow from said cup to said separate plate.

DETAILED DESCRIPTION OF PREFERRED EMBODIMENTS

Figure 1:
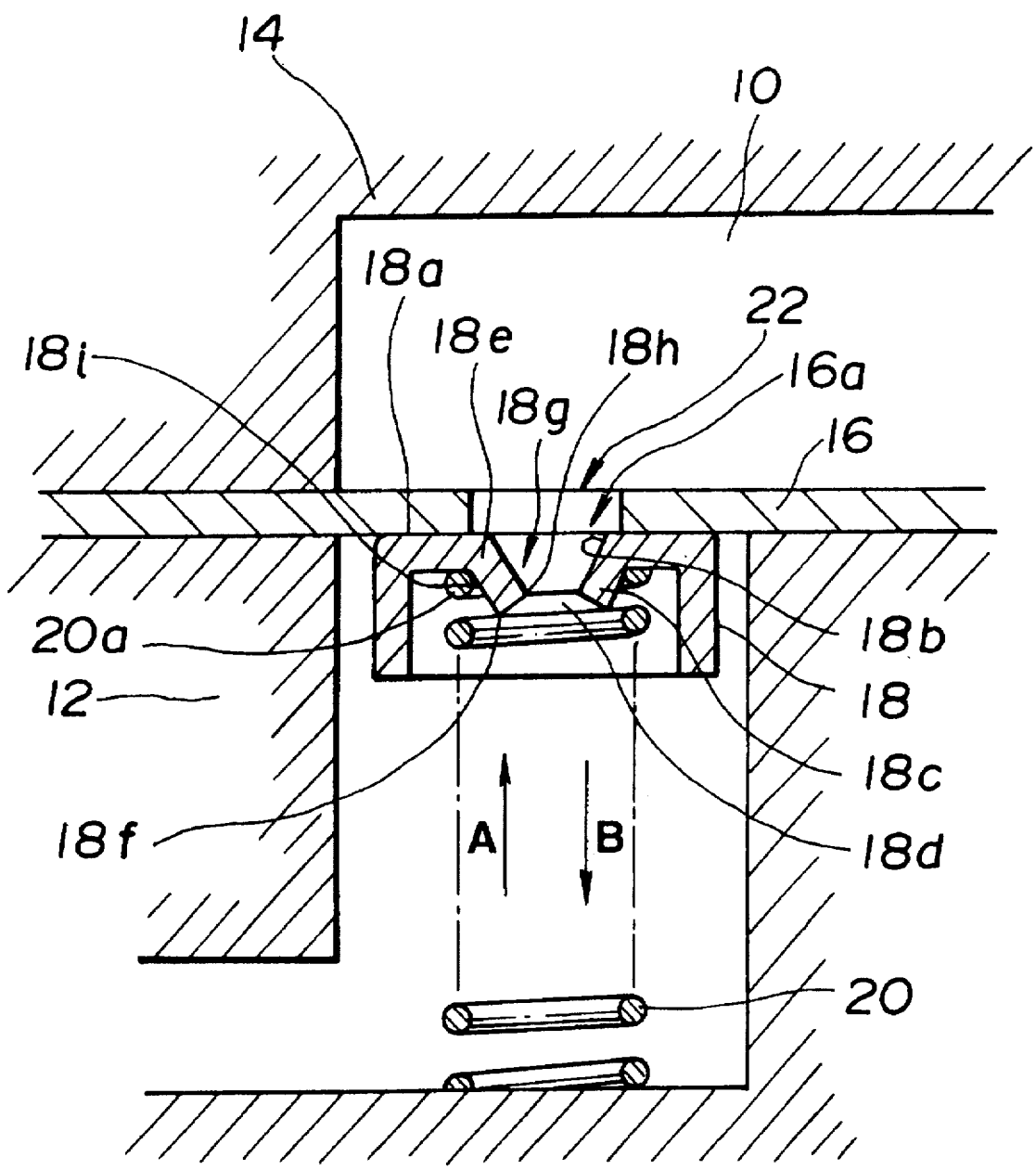
FIG. 1 is a sectional view showing a first preferred embodiment of a hydraulic control system with a one-way orifice for automatic transmissions.

Referring to the drawings, a description will be made with regard to preferred embodiments of a hydraulic control system with a one-way orifice for use in automatic transmissions.

Figure 2:
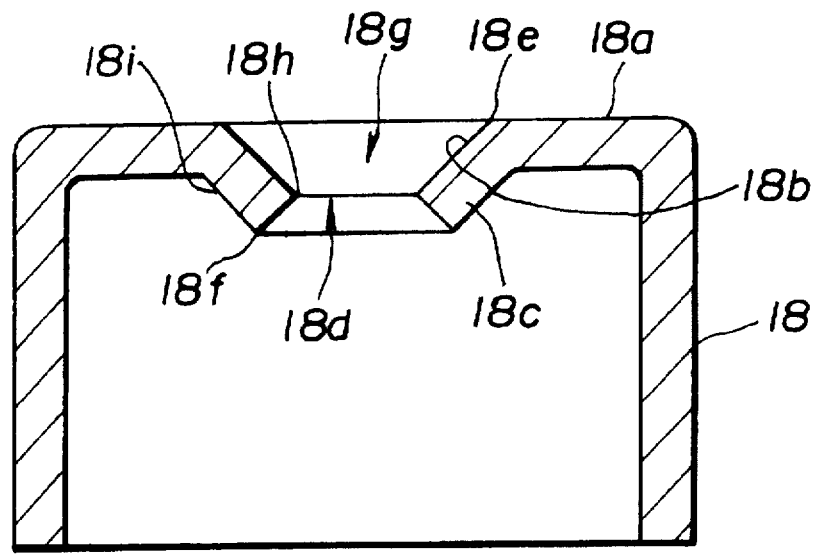
FIG. 2 is a view similar to FIG. 1, showing a cup.

FIGS. 1–2 show a first embodiment of the present invention. Referring to FIG. 1, interposed between two valve bodies 12, 14, which constitute a hydraulic circuit 10 when connected to each other, is a separate plate 16 which is formed with a first hole 16a for communication between the valve bodies 12, 14.

Disposed in the valve body 12 is a cup 18 having a bottom 18a which is always biased by a spring 20 in the direction so that it is in contact with the separate plate 16. As best seen in FIG. 2, the bottom 18a of the cup 18 is formed with a second hole 18g in the center thereof. The second hole 18g includes a truncated-cone hole 18b defined by a protrusion 18c which is formed by press working from an outer side end 18e to protrude inwardly. The truncated-cone hole 18b has a smaller radial dimension than the first hole 16a. Press working allows the second hole 18g to have an outer side periphery corresponding to a small-diameter end or minimum-diameter portion 18h of the truncated-cone hole 18b, and an inner side periphery corresponding to an inner side end 18f that is larger in diameter than to the small-diameter end 18h so as to form an opening 18d. It is understood that the truncated-cone hole 18b and the opening 18d constitute the second hole 18g. The protrusion 18c formed by press working has a reverse side with respect to the truncated-cone hole, that serves as a spring holding face 18i that holds the spring 20 via engagement with an inner-diameter portion of a spring end 20a as shown in FIG. 1. The second hole 18g is concentrically positioned with respect to the first hole 16a of the separate plate 16 to form a one-way orifice 22. The one-way orifice 22 is shaped such that the radial dimension is at the minimum-diameter portion 18h of the second hole 18g, and increases therefrom to the first hole 16a and the inner side end 18f. When oil flows through the one-way orifice 22 in the direction of arrow A in FIG. 1, the flow rate is determined by the second hole 18g. When oil flows through the one-way orifice 22 in the direction of arrow B in FIG. 1, the flow rate is determined by the first hole 16a.

As described above, since the one-way orifice 22 includes the first hole 16a and the second hole 18g having a smaller diameter than the first hole 16a, and the second hole 18g is shaped substantially like a double cone having a diameter increased from the minimum-diameter portion 18h to the outer and inner side ends 18e, 18f, a reduction can be obtained in the axial length of the minimum-diameter portion 18h of the one-way orifice 22, i.e. the length of contact of oil with the one-way orifice 22, resulting in reduced oil noise flowing therethrough.

Further, since the above shaping of the second hole 18g of the cup 18 allows a reduction in the length of contact of oil with the one-way orifice 22, there is no need to form a conical surface, having a large gradient, to the separate plate 16 so as to increase the radial dimension of the one-way orifice 22 on the side of the valve body 14, resulting in no interference of the one-way orifice 22 with a sealing member of the valve body 14.

Furthermore, when forming the protrusion 18c for defining the truncated-cone hole 18b by press working from the outer side end 18e of the cup 18 to protrude inwardly, the minimum-diameter portion 18h and the opening 18d are obtained together with the truncated-cone hole 18b, resulting in easy formation of the second hole 18g shaped substantially like a double cone having a diameter increased from the minimum-diameter portion 18h to the outer and inner side ends 18e, 18f. Moreover, the reverse side of the protrusion 18c with respect to the truncated-cone hole 18b serves as the spring holding face 18i, resulting in effective restraint of radial movement of the end 20a of the spring 20 engaged therewith.

Still further, since the second hole 18g of the cup 18 includes a conical portion (the truncated-cone hole 18b and the opening 18d) for reducing oil noise, the first hole 16a of the separate plate 16 only needs to be larger in diameter than the second hole 18g, and can be shaped like any of a cone and a cylinder, resulting in reduced kinds of separate plates.

Figure 3:
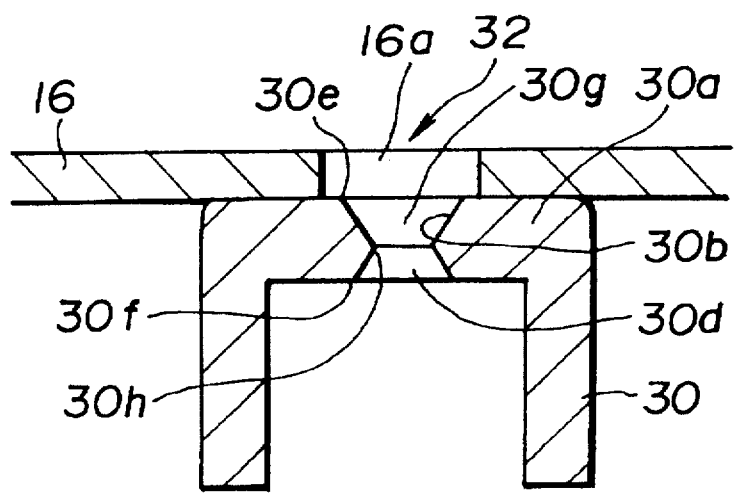
FIG. 3 is a view similar to FIG. 2, showing a second preferred embodiment of the present invention.

FIG. 3 shows a second embodiment of the present invention. In the second embodiment, a bottom 30a of a cup 30 has a greater vertical dimension than the bottom 18a of the cup 18 in the first embodiment. The bottom 30a has a truncated-cone hole 30b in the center thereof, which is shaped like a truncated cone developing downward from an outer side end 30e. Moreover, the bottom 30a has an opening 30d in the center thereof, which has a smaller diameter than the truncated-cone hole 30b, and is shaped like a truncated cone developing upward from an inner side end 30f. The truncated-cone hole 30b and the opening 30d constitute a second hole 30g, and a periphery of a meeting of the two forms a minimum diameter portion 30h. The second hole 30g of the cup 30 is smaller in diameter than the first hole 16a of the separate plate 16 in the same way as in the first embodiment.

In such a way, in the same way as in the first embodiment, a one-way orifice 32 includes the first hole 16a and the second hole 30g having a smaller diameter than the first hole 16a, and the second hole 30g is shaped substantially like a double cone having a diameter increased from the minimum-diameter portion 30h to the outer and inner side ends 30e, 30f of the bottom 30a. The reduction can be obtained in the axial length of the minimum-diameter portion 30h of the one-way orifice 32, i.e., the length of contact of oil with the one-way orifice 32, resulting in reduced oil noise flowing therethrough.

Further, due to a possible reduction in the axial length of the minimum-diameter portion 30h of the one-way orifice 32, there is no need to form a conical surface, having a large gradient, to the separate plate 16 so as to increase the radial dimension of the one-way orifice 32 on the side of the valve body 14, resulting in no interference of the one-way orifice 32 with the sealing member of the valve body 14.

Furthermore, since the second hole 30g of the cup 30 includes a conical portion (the truncated-cone hole 30b and the opening 30d) for reducing oil noise, the first hole 16a of the separate plate 16 only needs to be larger in diameter than the second hole 30g, and can be shaped like any of a cone and a cylinder, resulting in reduced kinds of separate plates.

Having described the present invention in connection with the preferred embodiments, it is noted that the present invention is not limited thereto, and various changes and modifications can be made without departing from the spirit of the present invention. By way of example, in the first embodiment, the truncated-cone hole 18b is formed by press working, alternatively, it may be formed in the other way.

What is claimed is:

1. A hydraulic control system, comprising:

valve bodies;

a separate plate interposed between said valve bodies, said separate plate being formed with a first hole for fluid communication between said valve bodies; and a cup disposed in one of said valve bodies, said cup having a bottom biased to contact said separate plate, said bottom being formed with a second hole fluidly communicating with said first hole, said second hole being smaller in diameter than said first hole, said second hole gradually decreasing in diameter up to a predetermined distance from said separate plate, said second hole gradually increasing in diameter from said predetermined distance, wherein said first hole is effective during fluid flow from said separate plate to said cup, and said second hole is effective during fluid flow from said cup to said separate plate.

2. A hydraulic control system as claimed in claim 1, further comprising:

a spring having an end engaging an inner side of said bottom of said cup.

3. A hydraulic control system, comprising:

valve bodies;

a separate plate interposed between said valve bodies, said separate plate being formed with a first hole for fluid communication between said valve bodies; and a cup disposed in one of said valve bodies, said cup having a bottom biased to contact said separate plate said cup having a second hole fluidly communicating with said first hole, said second hole being smaller in diameter than said first hole, said second hole gradually decreasing in diameter up to a predetermined distance from said separate plate, and said second hole gradually increasing in diameter from said predetermined distance, wherein said first hole is effective during fluid flow from said separate plate to said cup, and said second hole is effective during fluid flow from said cup to said separate plate.

4. A hydraulic control system as claimed in claim 3, wherein said second hole defining means include said bottom of said cup.

5. A hydraulic control system as claimed in claim 3, further comprising:

a spring having an end engaging an inner side of said bottom of said cup.

* * * * *

UNITED STATES PATENT AND TRADEMARK OFFICE
CERTIFICATE OF CORRECTION

PATENT NO. : 5,950,678
DATED : September 14, 1999
INVENTOR(S) : SHIMOYAMA *et al.*

It is certified that error appears in the above-indentified patent and that said Letters Patent is hereby corrected as shown below:

Title page item [73] Assignee, please insert - - JATCO Corporation, Fuji-shi, Japan - - .

Signed and Sealed this

Fifteenth Day of August, 2000

Attest:

Q. TODD DICKINSON

Attesting Officer

Director of Patents and Trademarks